Oct. 7, 1924.  1,511,090
A. OLMSTED
GRASS SEPARATOR
Filed June 23, 1921    2 Sheets-Sheet 1
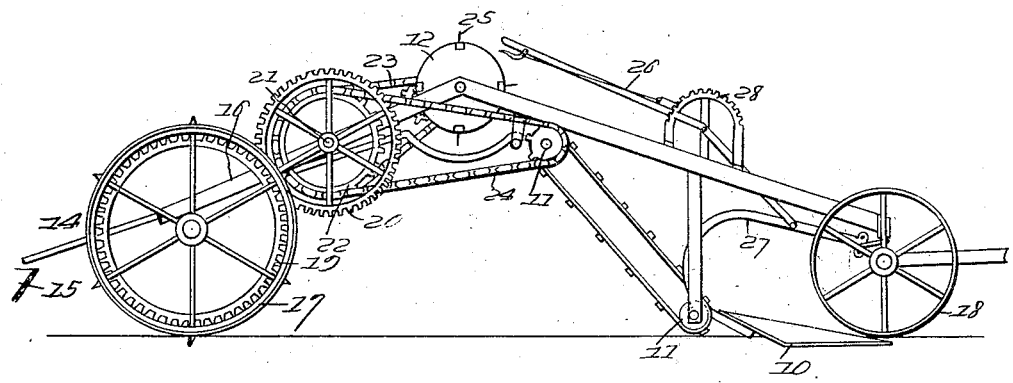
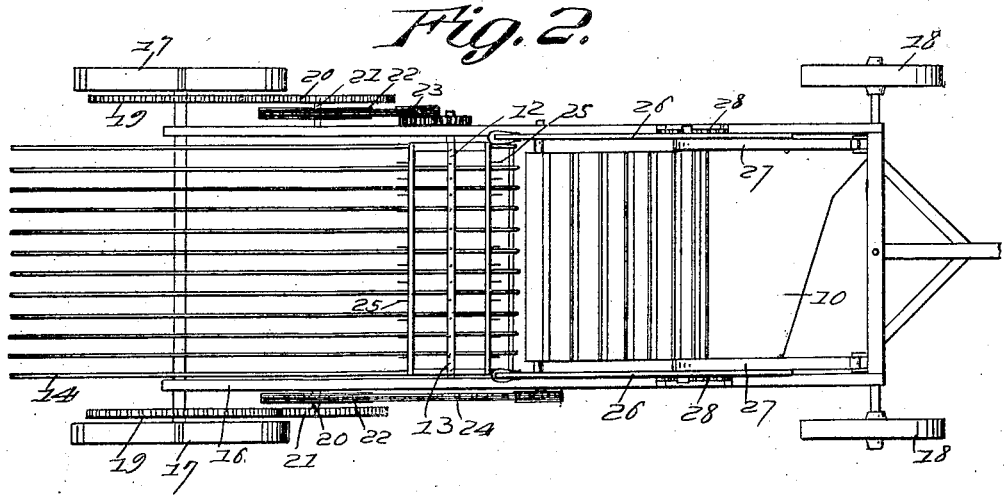
Inventor
Albert Olmsted,
By
Attorney

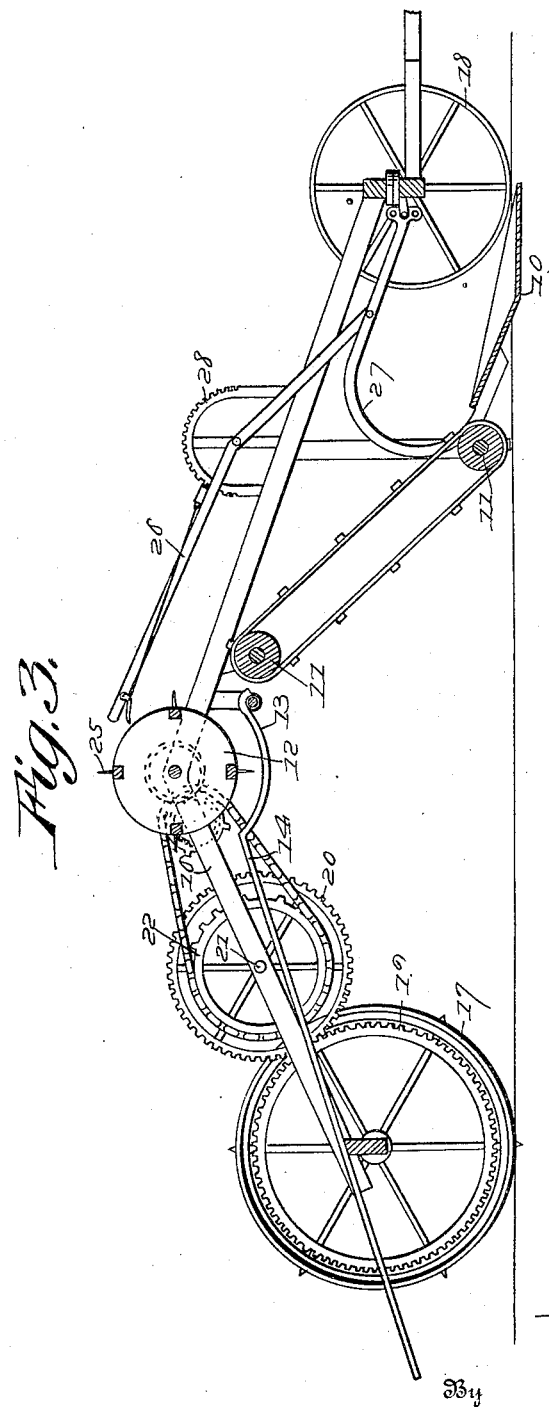

Patented Oct. 7, 1924.

1,511,090

UNITED STATES PATENT OFFICE.

ALBERT OLMSTED, OF BALMORAL, MANITOBA, CANADA.

GRASS SEPARATOR.

Application filed June 23, 1921. Serial No. 479,818.

*To all whom it may concern:*

Be it known that ALBERT OLMSTED, a subject of the King of Great Britain, residing at Balmoral, in the Province of Manitoba and Dominion of Canada, has invented new and useful Improvements in Grass Separators, of which the following is a specification.

The object of the invention is to provide an agricultural implement of a type suitable for breaking ground which has become overgrown with grass and weeds, under such conditions as to effect the separation of the grass, weeds and like vegetation from the earth and pulverizing and returning the latter while disposing of the vegetation in such a way as to permit of the gathering and removing thereof with facility, the soil being left in a proper condition for seeding or planting; and with this object in view the invention consists in a construction, combination and relation of parts of which a preferred embodiment is shown in the accompanying drawings, wherein:—

Figure 1 is a side view of an apparatus constructed in accordance with the invention.

Figure 2 is a plan view of the same.

Figure 3 is a longitudinal sectional view thereof.

The apparatus embodies essentially a plow 10 preferably of a broad and substantially flat form designed to pass under and lift the soil with the grass and weeds, no mold-board being employed, said plow being disposed in an upwardly and rearwardly inclined position, rollers 11 for receiving the soil and vegetation from the plow blade and conveying the same upwardly and rearwardly, a cylinder and concave 12 and 13 for receiving the material from the rollers which constitute the conveyor, and a shaker screen 14 disposed in a downwardly and rearwardly inclined position for receiving the material from the cylinder and separating the earth from the vegetation and dropping the former to the ground while conducting the vegetation to the rear for deposit upon the surface of the ground or for reception by a suitable container indicated at 15.

The frame 16 of the structure may be of any suitable form supported by the rear driving wheels 17 and the front steering wheels 18, said ground wheels being connected by gear wheels 19 and 20 with a countershaft 21 carrying sprocket wheels 22 over which extend chains 23 and 24 for actuating the cylinder 12 and the conveyor rolls 11. The cylinder is preferably provided with peripheral teeth 25 to co-act with the concave to aid in separating the vegetation from the earth and the plow is subject to modification in depth of operation by means of hand levers 26 suitably connected with the plow beams 27 and operating in connection with gear segments 28.

Having described the invention, what is claimed as new and useful is:—

A grass destroyer comprising a frame, a sod cutter and lifter attached thereto, an elevator arranged to receive the sod from the cutter and lifter, spaced rods mounted upon the frame and adapted to receive the sod from the elevator, said rods being downwardly and rearwardly inclined and having at their upper portions concaved sections and a cylinder arranged for rotation over the said concaved sections of the rods.

In testimony whereof he affixes his signature.

ALBERT OLMSTED.